_United States Patent Office_ 3,031,213
Patented Apr. 24, 1962

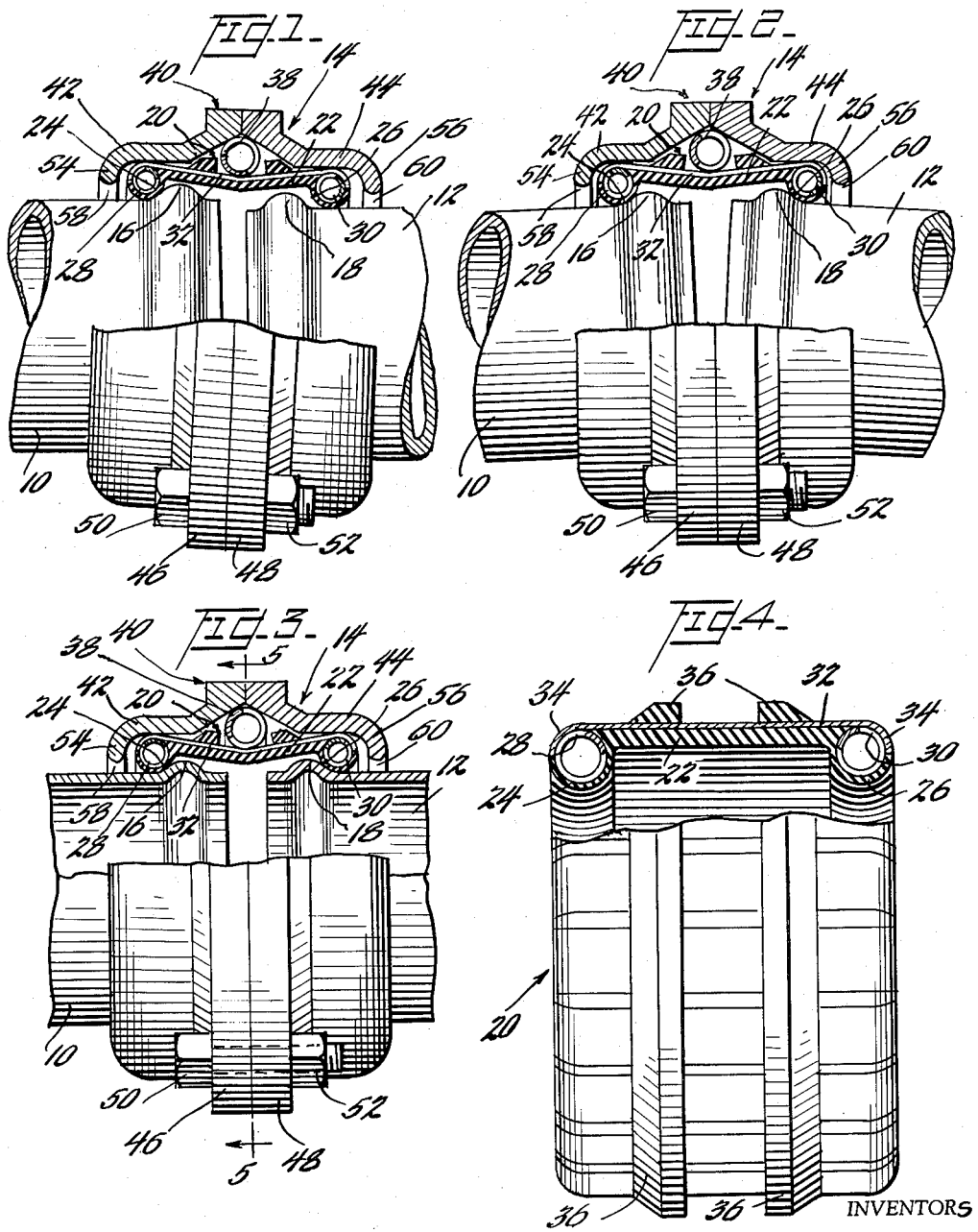

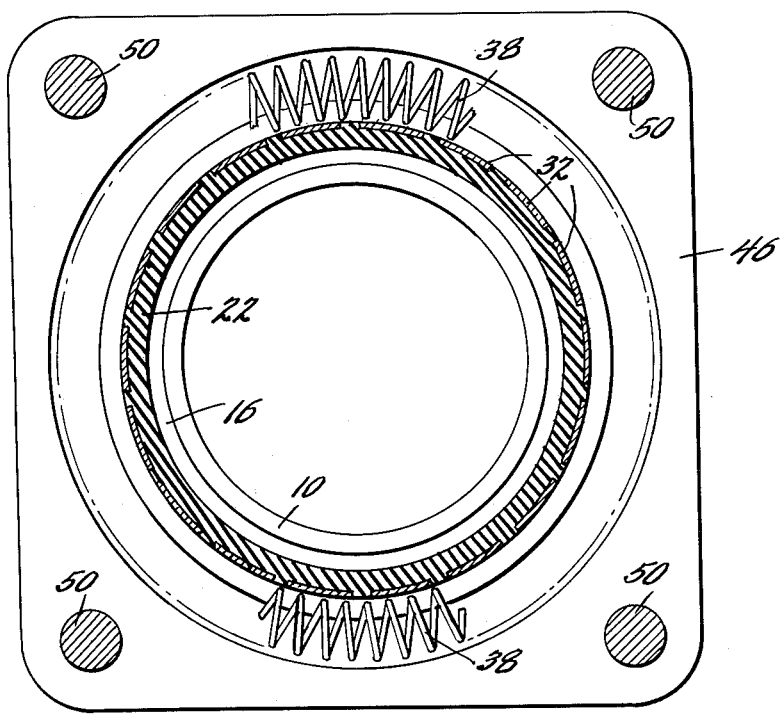
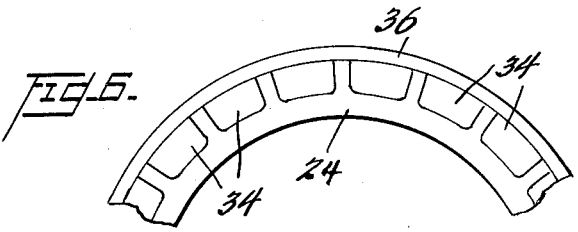

3,031,213
FLEXIBLE TUBE COUPLER
Earl F. Bruning, 601 S. 9th St., Lincoln, Nebr., and Noel Naidenoff, Rte. 2, Derby, Kans.
Filed Feb. 5, 1958, Ser. No. 713,489
8 Claims. (Cl. 285—233)

This invention relates to a flexible coupling for tubes or pipes, and more particularly to a coupling which permits angular and offset mis-alignment of the coupled pipe sections and which affords a range of axial adjustment of the pipe sections while maintaining a tight seal to prevent leakage of the fluid contents of the pipe sections.

Flexible couplings for rigid pipe sections have many fields of application and in recent years a demand has been created for improved flexible pipe couplings, particularly in the aircraft industry wherein such couplings are utilized to join sections of rigid pipe or tubing in the fuel, lubricating, or the hydraulic actuator systems of the aircraft.

For some fields of application, a coupling comprising a length of flexible tubing connected at its ends to the rigid pipe sections to be coupled performs adequately. However, with such couplings it is difficult to obtain and maintain a tight seal between the flexible tubing and the rigid pipe sections, and after protracted use, the seal fails, particularly when the coupling is subjected to considerable mechanical stress under high fluid pressure. Attempts have been made to obtain a workable flexible fluid coupling through the use of flexible gaskets or sealing rings which engage the outer surfaces of the pipe sections adjacent their opposed ends, the gaskets or sealing rings being held against the pipe surfaces by a rigid outer casing. Such couplings have been employed especially in connection with pipes having end beads, that is, pipes having external circumferential beads at or adjacent to their ends. While couplings of the latter type have achieved a fair measure of success, their performance under high stress and fluid pressure conditions over long periods of time has not been entirely satisfactory, and it has been difficult to obtain the desired flexibility and at the same time to maintain the seal. One reason for the failure of such couplings has been discovered to be the inability to maintain a perfect seal through the application of a compressing force to the gasket or rings by a rigid member.

It is accordingly a principal object of the present invention to provide an improved flexible pipe or tube coupling which overcomes the foregoing and other disadvantages of the couplings employed heretofore.

Another object of the invention is to provide a pipe coupling which will accommodate substantial axial offset of the pipe sections coupled, substantial angular mis-alignment, and substantial variation in the gap between the ends of the pipe sections, and which at the same time will operate to maintain a perfect seal under high pressure and mechanical loading.

A further object of the invention is to provide a coupling of the aforesaid type which prevents separation of the pipe sections under the axial loading resulting from the high fluid pressure.

An additional object of the invention is to provide a fluid coupling of the aforesaid type which has an amount of resiliency to maintain constant loading on the sealing elements.

A further object of the invention is to provide a coupling of the aforesaid type that operates properly even with a minimum of pipe support.

Yet another object of the invention is to provide a coupling of the aforesaid type that is especially useful in the coupling of beaded pipe.

Still another object of the invention is to provide an improved coupling that is simple to manufacture and assemble with the pipe sections.

The foregoing and other objects of the invention and the exact manner in which such objects are accomplished will become more readily apparent upon consideration of the following detailed description of the invention when taken in conjunction with the accompanying drawings, which illustrate a preferred embodiment of the invention and wherein:

FIGURE 1 is a partly sectional side view illustrating the application of the principles of the invention to the flexible coupling of rigid sections of beaded pipe and demonstrating how the invention accommodates axial offset of the pipe sections;

FIGURE 2 is a similar view demonstrating the accommodation of angular mis-alignment of the section axes;

FIGURE 3 is a similar view illustrating the appearance of the invention when the pipe sections are aligned, but spaced differently from the spacing of FIGURE 1;

FIGURE 4 is a partly sectional side view of a novel sealing member which forms part of the invention;

FIGURE 5 is an enlarged transverse sectional view taken along line 5—5 of FIGURE 3; and FIGURE 6 is an end view of a detail of the construction of the sealing member of FIGURE 4.

Briefly stated, the present invention comprises a coupling having a flexible annular sealing member adapted to surround the opposed ends of the pipe sections to be coupled and having a pair of internal sealing beads adapted to engage the outer surfaces of the respective pipe sections. In a specific form of the invention the pipe sections have external end beads and the beads of the sealing member are located at the sides of the external end beads remote from the opposed pipe ends and include annular coil springs, the portion of the sealing member between the sealing beads being surrounded by a compression ring in the form of an annular coil spring. This ring is urged against the sealing member by an outer casing which surrounds the foregoing structure and which is provided with openings through which the pipe sections pass with enough freedom to allow a substantial amount of axial offset and angular mis-alignment. In the aforementioned specific form of the invention, the sealing member is further provided with resilient strips which extend between the sealing beads and are flexed by the compression ring.

Referring to the drawings, and especially to FIGURES 1 through 3, reference numerals 10 and 12 designate sections of rigid pipe that are to be coupled by the coupling 14 of the invention. The pipe sections are provided with external circumferential end beads 16, 18, which are formed at or near the ends of the respective pipe sections. The pipes may be composed of aluminum or steel, for example.

The coupling of the invention comprises an annular sealing member 20 which surrounds the opposed ends of the pipe sections. In the preferred form the sealing member comprises an annular web 22 formed integrally with a pair of internal sealing beads 24, 26. The sealing member (see FIGURE 4) is flexible and is preferably formed of a resilient material such as synthetic rubber. The internal beads 24, 26 act as sealing rings and engage the outer surfaces of the respective pipe sections 10 and 12 at the sides of the external beads 16 and 18 remote from the opposed ends of the pipe sections. To give the internal beads a certain amount of solidity and yet provide a degree of resiliency, the beads are preferably formed about annular coil springs 28, 30 commonly known as garter springs. To stiffen the web 22 and yet provide the desired degree of resiliency, the web is preferably provided with a plurality of resilient strips or leaf springs 32, which like the garter springs may be formed of stainless steel and which are spaced about the circumference of the web, spanning the distance between and substantially perpendicular to the internal beads 24 and 26, as shown in FIGURE 4. The strips 32 may have curved end portions 34 (FIGURES 4 and 6) which conform to the outer contours of the internal beads. The web, internal beads, garter springs, and leaf spring strips may be made substantially integral by forming the sealing member in a single molding operation. In the form shown, the outer surfaces of the strips 32 are substantially flush with the outer surface of the web 22 except where the strips pass under projections 36, the function of which will be described.

Surrounding the sealing member, and more specifically the web 22, is a compression ring 38 preferably constituted by an annular coil spring or garter spring, which may be formed of stainless steel and is best shown in FIGURE 5. This spring is placed in tension when it is assembled over the sealing member. Projections 36, which may be annular and form a channel with the outer surface of the web 22, serve to maintain the compression ring 38 in place when the coupling is assembled in a manner to be described.

Surrounding the compression ring and the sealing member is a housing or casing 40, which in the form shown comprises two annular half sections 42, 44 which are formed with flanges 46, 48 having bores through which a plurality of bolts 50 may be passed to join the halves of the housing when nuts 52 are threaded onto the bolts as shown. The housing has annular end walls 54, 56 provided with openings 58, 60 through which the respective pipe sections pass with substantial freedom. The diameter of the openings is made sufficiently great to allow the desired degree of axial offset and angular mis-alignment and yet is made small enough to prevent the passing of the internal beads 24 and 26 through the openings. The casing is flared internally of the flanges 46 and 48 to receive the compression ring 38.

To assemble the coupling on the ends of the pipe sections, the housing sections 42, 44 are first slipped back onto the respective pipe sections over the external beads 16 and 18 (the openings 58 and 60 being large enough to permit such assembly). Then the ends of the pipe sections are forced into the sealing member 20, the resiliency of the internal beads 24 and 26 being relied upon to allow the external end beads 16 and 18 of the pipe sections to pass therethrough. The compression ring 38 has preferably been forced onto the sealing member prior to the assembly of the sealing member with the pipe sections. The axial length of the sealing member 20 is sufficient to allow a gap between the opposed ends of the pipe sections 10 and 12, and the length of the gap may vary somewhat. When the pipe sections have been inserted in the sealing member in the manner described, the housing sections are now brought together and are slipped over the internal beads and the intervening web. The space provided by the flaring of the casing within the flanges 46 and 48 is insufficient to accommodate the compression ring 38 without compression of the sealing member. Hence, when the casing sections are brought together and the bolts 50 inserted and nuts 52 tightened thereon, a compression force is exerted by the casing on the compression ring 38, and the ring is forced to contract and compress the central portion of the sealing member. In so doing, the ring flexes the leaf spring strips 32 as shown in FIGURES 1 through 3, and since the sealing member has a certain degree of rigidity, the compressive force is transmitted to the internal sealing beads 24 and 26, thereby urging the beads tightly against the outer surfaces of the respective pipe sections 10 and 12. The result is a tight seal between the internal beads and the pipe sections.

The resiliency afforded by the construction of the invention ensures a substantially constant sealing force at the sealing points, which is practically impossible to obtain with fixed mechanical compression to load the sealing points. Moreover, the construction of the invention provides much greater flexibility than is possible with fixed mechanical loading on the seals. The invention is capable of accommodating considerable variation in the length of the gap between the opposed ends of the pipe sections as well as considerable axial offset and angular mis-alignment. FIGURE 1 illustrates the manner in which the invention accommodates axial offset, and by comparing FIGURES 1 and 3 it can be seen that variation of the length of the gap between the opposed ends of the pipe sections is readily accommodated by the invention. FIGURE 2 illustrates the manner in which the invention accommodates angular mis-alignment of the pipe sections. The additional solidity afforded by the garter springs embedded within the internal beads greatly increases the resistance of the coupling to end loads or thrusts on the tubing developed mechanically or by fluid pressure within the system. Additional resistance to end loading is provided by the walls of the housing adjacent the internal beads, the internal sealing beads serving as wedges between the housing and the external pipe beads under extreme end thrust. However, while the housing may be in contact with the sealing beads at these points, the basic compression of the beads is provided indirectly through the compression ring 38.

In a practical form of the invention, the coupling described has been found to be capable of withstanding $\frac{1}{16}$ inch axial offset, 3 degrees axial mis-alignment in any direction, a variation in gap between the ends of the tubes from $\frac{1}{16}$ inch to $\frac{3}{16}$ inch, and a proof pressure of 375 p.s.i. and the mechanical end loading or thrust generated on the tubes by that pressure. Under all the foregoing conditions, leakage has been zero.

While a preferred form of the invention has been shown and described, it will be apparent to those skilled in the art that changes may be made in this form without departing from the principles and spirit of the invention, the scope of which is defined in the appended claims. Accordingly, the foregoing embodiment is to be considered illustrative rather than restrictive of the invention, and those modifications which come within the meaning and range of equivalency of the claims are included therein.

We claim:

1. In combination with a pair of pipe sections having external circumferential beads adjacent their opposed, spaced ends, a coupling comprising a pair of resilient annular sealing rings surrounding said pipe sections respectively in fluid tight relationship thereto at the sides of said beads remote from said ends, a resilient annular web integrally connecting said rings, a resilient annular compression ring surrounding said web, said compression ring having materially less axial extent than the web it surrounds and having sufficient compression power to independently modify the shape of the web, and a housing surrounding said ring, web, and sealing rings and so constructed and arranged as to urge said compression ring radially against said web and said sealing rings radially against their respective pipe sections, said housing having substantially radially extending annular end walls adjacent the respective sealing rings, said walls having openings through which said pipe sections pass, the openings being substantially larger in diameter than the outside diameter of the respective pipe sections and substantially smaller in diameter than the outside diameter of the respective sealing rings, whereby said pipe sections may move relative to said housing but said sealing rings and pipe beads are prevented from passing through said openings, said combination including means continuously acting toward holding the compression ring centered along the axial length of the sealing member.

2. The coupling of claim 1, said sealing rings having annular coil springs therein.

3. The coupling of claim 1, said compression ring comprising an annular coil spring.

4. The coupling of claim 1, said sealing member having projections on opposite sides of said ring for retaining the same.

5. The coupling of claim 1, said housing comprising two parts joined by connecting elements.

6. A flexible coupling for a pair of pipe sections having circumferential external end beads, comprising a flexible annular sealing member adapted to surround the opposed ends of said pipe sections and having a pair of internal sealing beads adapted to engage the outer surfaces of said sections at the sides of the pipe beads remote from the opposed pipe ends, circumferentially spaced resilient members extending longitudinally of said sealing member and overlying said beads, a resilient compression ring surrounding said sealing member and resilient members between said internal sealing beads, and a housing adapted to surround said compression ring and said sealing member and urge said ring against said members for compressing same and resiliently urging said beads inwardly against said pipe sections.

7. The coupling of claim 1 said annular web and sealing rings having axially extending, resilient strips spaced about the circumference of and extending the length of the web and sealing rings.

8. The coupling of claim 7, said web having projections spaced about its periphery and on opposite sides of said compression ring, for spacing said resilient strips and for retaining said compression ring.

References Cited in the file of this patent

UNITED STATES PATENTS

| | | |
|---|---|---|
| 570,170 | Greenfield | Oct. 27, 1896 |
| 2,167,865 | Beecher | Aug. 1, 1939 |
| 2,426,423 | Woolsey | Aug. 26, 1947 |
| 2,460,032 | Risley | Jan. 25, 1949 |
| 2,460,981 | Francisco | Feb. 8, 1949 |
| 2,567,773 | Krupp | Sept. 11, 1951 |
| 2,571,348 | Drinkwater | Oct. 16, 1951 |
| 2,893,760 | Jewell | July 7, 1959 |

FOREIGN PATENTS

| | | |
|---|---|---|
| 4,316 | Great Britain | Jan. 28, 1904 |
| 21,629 | Great Britian | Sept. 30, 1907 |
| 138,308 | Austria | July 25, 1934 |
| 462,787 | Great Britain | Mar. 16, 1937 |
| 543,529 | Great Britain | Mar. 2, 1942 |
| 627,278 | Great Britain | Aug. 4, 1949 |
| 484,214 | Canada | June 24, 1952 |
| 1,115,116 | France | Dec. 26, 1954 |
| 1,138,633 | France | Jan. 28, 1957 |